United States Patent
Takeuchi et al.

(10) Patent No.: US 11,623,300 B2
(45) Date of Patent: Apr. 11, 2023

(54) METHOD OF DETERMINING WHETHER OR NOT RESULT OF PROCESSING PROCESS OF LASER PROCESSING APPARATUS IS ACCEPTABLE

(71) Applicant: DISCO CORPORATION, Tokyo (JP)

(72) Inventors: Hiroki Takeuchi, Tokyo (JP); Masanobu Takenaka, Tokyo (JP); Yukito Akutagawa, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 409 days.

(21) Appl. No.: 17/003,529

(22) Filed: Aug. 26, 2020

(65) Prior Publication Data

US 2021/0060697 A1    Mar. 4, 2021

(30) Foreign Application Priority Data

Aug. 27, 2019  (JP) .............................. JP2019-155068

(51) Int. Cl.
*B23K 26/0622* (2014.01)
*B23K 26/035* (2014.01)
(Continued)

(52) U.S. Cl.
CPC ........ *B23K 26/0622* (2015.10); *B23K 26/035* (2015.10); *B23K 26/032* (2013.01); *B23K 2101/40* (2018.08)

(58) Field of Classification Search
CPC .............. B23K 26/032; B23K 26/0853; B23K 26/364; B23K 2101/40; B23K 2103/50; B23K 26/082; B23K 26/40; B23K 26/402; B23K 26/53; B23K 2103/56; B23K 26/0622; B23K 26/359; B23K 2103/172; B23K 26/035; B23K 26/046; B23K 26/0648; B23K 26/073; B23K 26/0869;
(Continued)

(56) References Cited

U.S. PATENT DOCUMENTS

| 8,040,520 B2 * | 10/2011 | Sawabe | ................ | G01B 11/028 356/622 |
| 8,124,909 B2 * | 2/2012 | Sawabe | ................ | B23K 26/082 219/121.72 |

(Continued)

FOREIGN PATENT DOCUMENTS

JP         2003320466 A    11/2003

*Primary Examiner* — Chris Q Liu
(74) *Attorney, Agent, or Firm* — Greer Burns & Crain Ltd.

(57) ABSTRACT

There is provided a method of determining whether or not a result of a processing process of a laser processing apparatus is acceptable including a laser processing step of applying a laser beam to predetermined processing regions of a workpiece held on a chuck table, thereby performing a piercing process on the workpiece, an image capturing step of capturing images of all the processing regions while moving the image capturing unit and the workpiece relatively to each other, a detecting step of detecting regions where light is not transmitted through the workpiece among the processing regions in the image captured in the image capturing step, and a determining step of determining that the laser processing apparatus needs to be readjusted if the regions where light is not transmitted through the workpiece is equal to or more than the predetermined quantity.

3 Claims, 6 Drawing Sheets

(51) Int. Cl.
*B23K 26/03* (2006.01)
*B23K 101/40* (2006.01)

(58) Field of Classification Search
CPC .............. B23K 26/0884; B23K 26/705; B23K 26/0006; B23K 26/02; B23K 26/04; B23K 26/043; B23K 26/0624; B23K 26/0626; B23K 26/064; B23K 26/0665; B23K 26/067; B23K 26/08; B23K 26/0823; B23K 26/083; B23K 26/0876; B23K 26/352; B23K 26/36; B23K 26/38; B23K 26/382; B23K 26/57; B23K 26/702; B23K 37/04; H01L 21/67092; H01L 21/78; H01L 21/681; H01L 23/544; H01L 21/268; H01L 2221/68327; H01L 21/68764; H01L 2221/68327; H01L 2223/54426; H01L 2223/5446; H01L 21/67115; H01L 21/67132; H01L 21/67253; H01L 21/67259; H01L 21/67282; H01L 21/68; H01L 21/6831; H01L 21/6833; H01L 21/6838; H01L 21/68728; H01L 22/00; H01L 2221/68318; H01L 2221/6834; H01L 2221/68386; H01L 2223/54406; H01L 2223/54433; H01L 2223/54453; H01L 2223/54493; H01L 29/2003

USPC ............ 219/121.73, 121.72, 121.62, 121.67, 219/121.77, 121.78, 121.83
See application file for complete search history.

(56) References Cited

U.S. PATENT DOCUMENTS

| | | | | |
|---|---|---|---|---|
| 8,772,671 | B2* | 7/2014 | Broude | B23K 26/361 219/121.62 |
| 8,785,810 | B2* | 7/2014 | Hyun | B23K 26/02 372/24 |
| 9,149,866 | B2* | 10/2015 | Epale | B22C 9/105 |
| 2005/0145701 | A1* | 7/2005 | Silverbrook | H04N 1/00278 235/473 |
| 2008/0105665 | A1* | 5/2008 | Kondo | B23K 26/067 219/121.73 |
| 2008/0232677 | A1* | 9/2008 | Schwarz | B23K 31/125 382/152 |
| 2013/0319982 | A1* | 12/2013 | Frankel | B23K 26/032 219/121.72 |
| 2016/0172182 | A1* | 6/2016 | Morikazu | B23K 26/359 425/150 |
| 2017/0250102 | A1* | 8/2017 | Yoshino | H01L 21/67092 |
| 2018/0019168 | A1* | 1/2018 | Matsuzaki | H01L 21/6833 |
| 2018/0218932 | A1* | 8/2018 | Hanajima | H01L 21/6838 |

* cited by examiner

METHOD OF DETERMINING WHETHER OR NOT RESULT OF PROCESSING PROCESS OF LASER PROCESSING APPARATUS IS ACCEPTABLE

BACKGROUND OF THE INVENTION

Field of the Invention

The present invention relates to a method of determining whether or not a result of a processing process of a laser processing apparatus is acceptable.

Description of the Related Art

There has been known a laser processing apparatus for ablating a workpiece by applying a laser beam thereto as a processing apparatus for dividing a workpiece such as a semiconductor wafer into device chips (see JP 2003-320466A). The laser processing apparatus employs various optical elements for propagating a laser beam emitted from a laser oscillator to a processing point. The result of a processing process of the laser processing apparatus tends to vary significantly due to slight differences in a spot diameter of the laser beam emitted from the laser oscillator, distances between the optical elements, and so on. Therefore, it is necessary to confirm whether or not a desired result of a processing process has been achieved by actually processing a workpiece on the laser processing apparatus.

SUMMARY OF THE INVENTION

It has currently been customary for the operator of the laser processing apparatus to visually check the processed workpiece with a microscope for determining the result of the processing process. However, in a case where there are processed and unprocessed regions along a processed line on the workpiece, a problem arises in that criteria for evaluating the processed workpiece are indefinite because the operator's judgement depends on the operator's experience and skill.

It is therefore an object of the present invention to provide a method of determining, quantitatively on a laser processing apparatus, whether or not a result of a processing process of the laser processing apparatus is acceptable.

In accordance with an aspect of the present invention, there is provided a method of determining whether or not the result of a processing process of a laser processing apparatus is acceptable. The laser processing apparatus includes a chuck table including a transparent or semitransparent holding member having a holding surface for holding a surface of a workpiece in its entirety and light-emitting bodies disposed sideways of a surface of the holding member remote from the holding surface, a laser beam applying unit for applying a laser beam having a wavelength that is absorbable to the workpiece to the workpiece held on the chuck table, a moving unit for moving the chuck table and the laser beam applying unit relatively to each other, and an image capturing unit for capturing an image of the workpiece held on the chuck table. The method includes a laser processing step of applying a laser beam to predetermined processing regions of the workpiece held on the chuck table, thereby performing a piercing process on the workpiece, a light-emitting body energizing step of energizing the light-emitting bodies while the workpiece is being held on the chuck table, after the laser processing step and the light-emitting body energizing step, an image capturing step of capturing images of all the processing regions while moving the image capturing unit and the workpiece relatively to each other, a detecting step of detecting regions where light is not transmitted through the workpiece among the processing regions in the image captured in the image capturing step, and after the detecting step, a determining step of determining that the laser processing apparatus does not need to be readjusted if the regions where light is not transmitted through the workpiece is less than a predetermined quantity and that the laser processing apparatus needs to be readjusted if the regions where light is not transmitted through the workpiece is equal to or more than the predetermined quantity.

Preferably, the method of determining whether or not the result of the processing process of the laser processing apparatus is acceptable, further includes an outer circumferential edge detecting step of detecting an outer circumferential edge of the workpiece by capturing an image of the workpiece with the image capturing unit; and a calculating step of calculating a length of one line in its entirety in the processing regions on the basis of a result of the outer circumferential edge detecting step. A criterion by which to determine whether or not the laser processing apparatus needs to be readjusted in the determining step includes a ratio of a length of the regions where light is not transmitted through the workpiece as detected in the detecting step to the length of one line in its entirety calculated in the calculating step length of the regions where light is not transmitted through the workpiece as detected in the detected step to the length of one line in its entirety calculated in the calculating step.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will be described in detail below with reference to the drawings. The present invention is not limited to the details of the embodiments described below. The components described below cover those which could easily be anticipated by those skilled in the art and those which are essentially identical thereto. Furthermore, the arrangements described below can be used in appropriate combinations. Various omissions, replacements, or changes of the arrangements may be made without departing from the scope of the present invention.

First Embodiment

Figure 1:
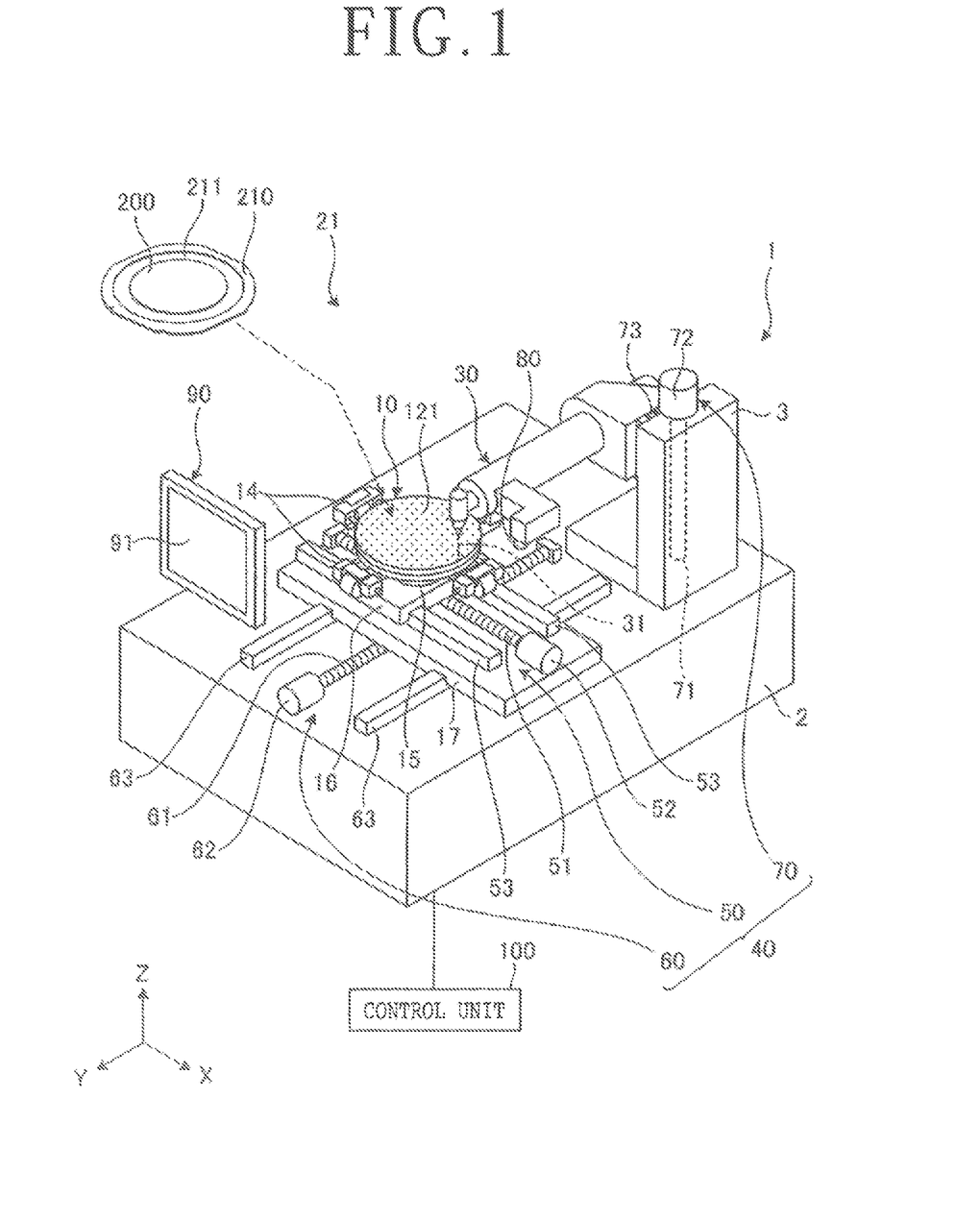
FIG. 1 is a perspective view illustrating a structural example of a laser processing apparatus that carries out a method of determining whether or not a result of a processing process of a laser processing apparatus is acceptable according to a first embodiment of the present invention.
Figure 2:
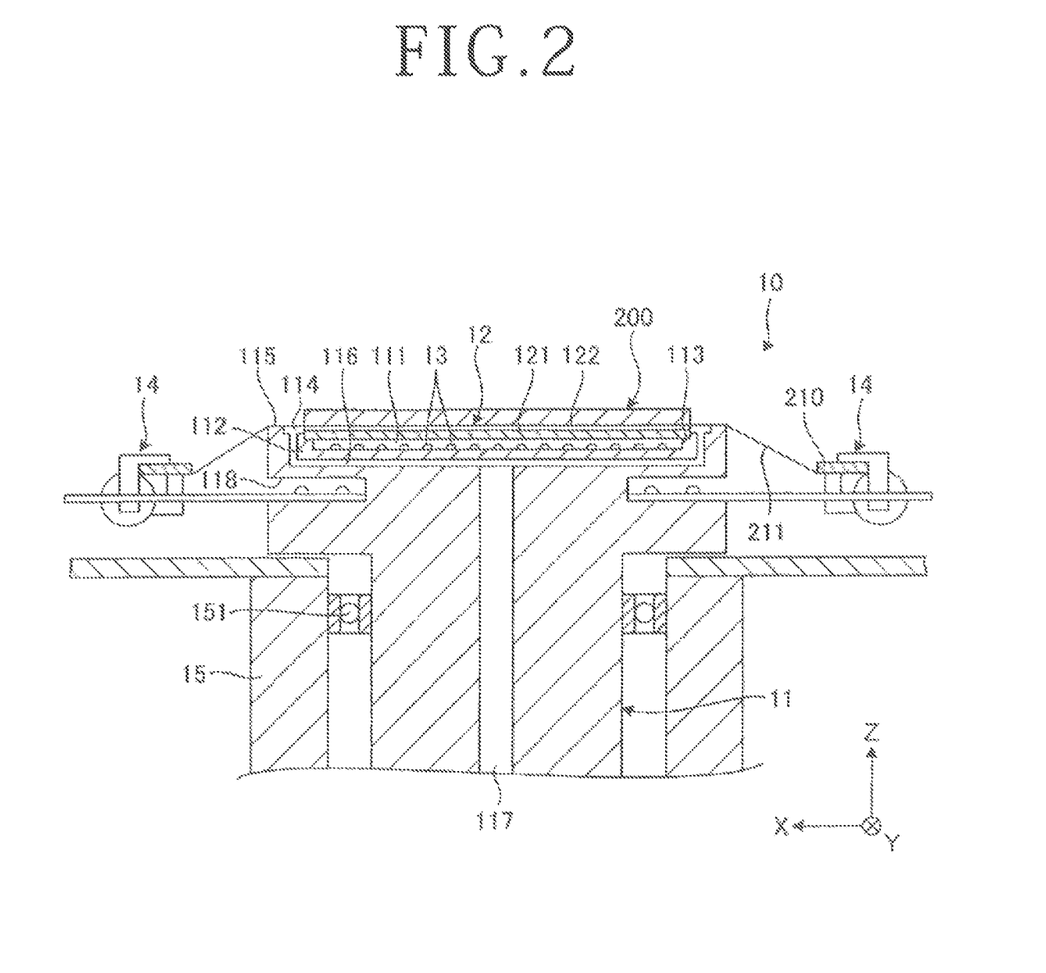
FIG. 2 is a cross-sectional view schematically illustrating a chuck table of the laser processing apparatus illustrated in FIG. 1.
Figure 3:
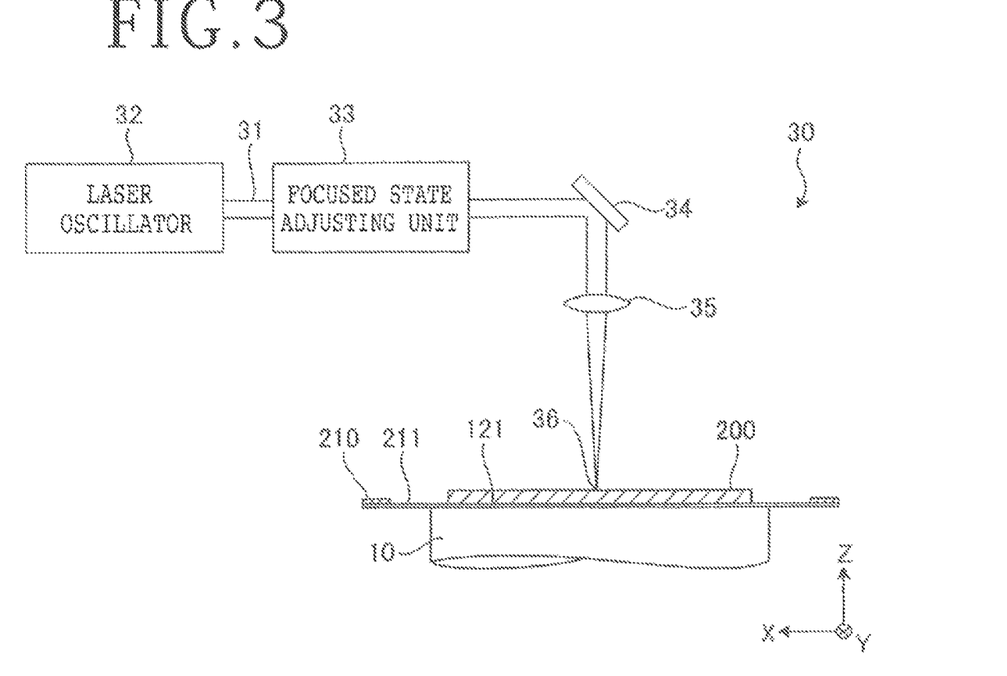
FIG. 3 is a view, partly in block form, illustrating a configuration of a laser beam applying unit of the laser processing apparatus illustrated in FIG. 1.
Figure 4:
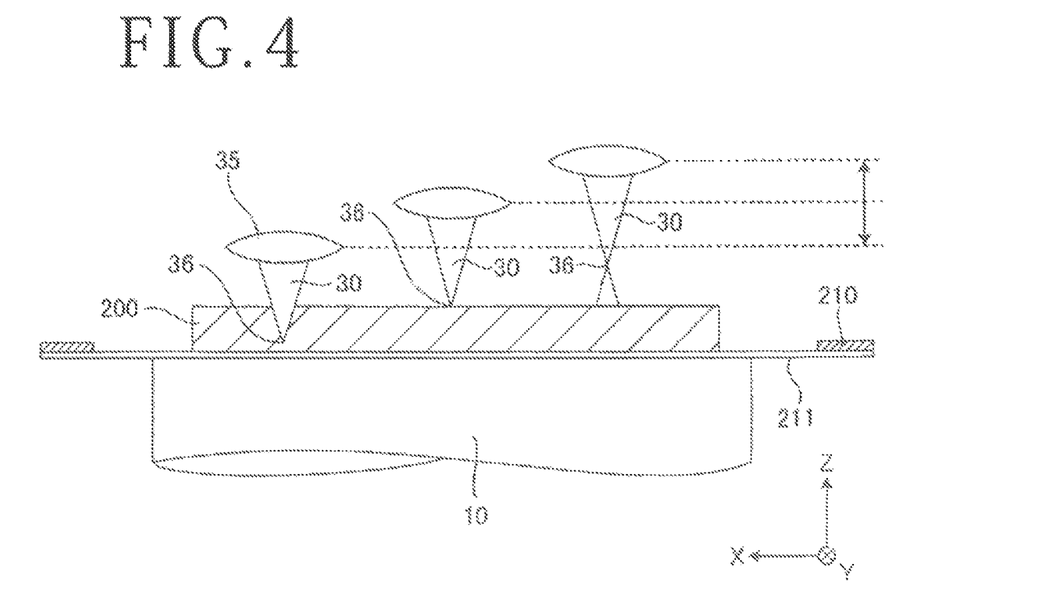
FIG. 4 is a schematic view illustrating a manner in which the laser beam applying unit illustrated in FIG. 3 applies a laser beam to a workpiece.

A method of determining whether or not a result of a processing process performed by a laser processing apparatus is acceptable according to a first embodiment of the present invention, will be described below with reference to the drawings. First, a configuration of the laser processing apparatus according to the first embodiment will be described below. FIG. 1 illustrates in perspective a structural example of the laser processing apparatus, denoted by 1, that carries out the method of determining whether or not the result of a processing process performed by the laser processing apparatus 1 is acceptable according to the first embodiment. FIG. 2 schematically illustrates in cross section a chuck table 10 of the laser processing apparatus 1 illustrated in FIG. 1. FIG. 3 illustrates, partly in block form, a configuration of a laser beam applying unit 30 of the laser processing apparatus 1 illustrated in FIG. 1. FIG. 4 schematically illustrates a manner in which the laser beam applying unit 30 illustrated in FIG. 3 applies a laser beam 31 to a workpiece 200. In the drawings and the description that follows, X-axis directions refer to directions in a horizontal plane, and Y-axis directions refer to directions in the horizontal plane that are perpendicular to the X-axis directions. Z-axis directions refer to directions perpendicular to the X-axis directions and the Y-axis directions. In the laser processing apparatus 1 according to the first embodiment, the chuck table 10 is movable relatively to the laser beam applying unit 30 in processing feed directions as the X-axis directions and indexing feed directions as the Y-axis directions.

As illustrated in FIG. 1, the laser processing apparatus 1 includes a chuck table 10, a laser beam applying unit 30, a moving assembly 40, an image capturing unit 80, a display unit 90, and a control unit 100. The laser processing apparatus 1 according to the first embodiment is an apparatus for processing the workpiece 200, which is a target to be processed, by applying the laser beam 31 to the workpiece 200. According to the first embodiment, the types of processing processes that the laser processing apparatus 1 can perform on the workpiece 200 include at least a piercing process such as a cutting process for cutting the workpiece 200 along projected dicing lines thereon. For example, the laser processing apparatus 1 may perform a grooving process for forming grooves in a surface of the workpiece 200.

According to the first embodiment, the workpiece 200 processed by the laser processing apparatus 1 is in the form of a disk-shaped device wafer having a substrate made of silicon, sapphire, gallium arsenide, or the like, and is used as a dummy wafer for reference processing. The workpiece 200 is supported on an annular frame 210 by an expandable tape 211. The annular frame 210 has an opening therein whose diameter is larger than a diameter of the workpiece 200. The expandable tape 211 is affixed to a reverse side of the annular frame 210. The expandable tape 211 includes a base layer made of expandable and shrinkable synthetic resin and an adhesive layer made of expandable and shrinkable adhesive synthetic resin, the adhesive layer being stacked on the base layer. The workpiece 200 is positioned at a predetermined position in the opening in the annular frame 210 and has a reverse side affixed to the expandable tape 211, so that the workpiece 200 is secured to the annular frame 210 and the expandable tape 211.

The chuck table 10 holds the workpiece 200 thereon. According to the first embodiment, as illustrated in FIG. 2, the chuck table 10 includes a cylindrical body 11, a holding member 12, and light-emitting bodies 13. The cylindrical body 11 includes a fitting cavity 111, a holding member support 112, a rest shelf 113, a suction groove 114, a seal 115, a fluid communication path 116, a suction channel 117, and an attachment slot 118.

The fitting cavity 111 is defined as a circular cavity in an upper surface of the cylindrical body 11. The holding member support 112 is in the form of an annular ridge surrounding the fitting cavity 111. The rest shelf 113 is defined as an annular recess in an inner circumferential portion of the holding member support 112. The holding member 12 is placed on the rest shelf 113. The suction groove 114 is defined as an annular groove surrounding the holding member support 112. The seal 115 surrounds the suction groove 114. The fluid communication path 116 is held in fluid communication with the suction groove 114. The suction channel 117 is held in fluid communication with the fluid communication path 116. The suction channel 117 is connected to a vacuum suction source, not illustrated. When the vacuum suction source is actuated, it generates a negative pressure that is transmitted through the suction channel 117 and the fluid communication path 116 and acts in the suction groove 114. The attachment slot 118 is defined as an annular slot in an outer circumferential surface of an upper portion of the cylindrical body 11.

The holding member 12 is disposed on the upper surface of the cylindrical body 11. According to the first embodiment, the holding member 12 is placed on the rest shelf 113 in the inner circumferential portion of the holding member support 112. The holding member 12 includes a transparent or semitransparent member having a holding surface 121. According to the first embodiment, the holding member 12 is in the form of a quartz plate having a thickness in the range of 2 to 5 mm. The holding surface 121 holds the entire reverse side of the workpiece 200 thereon. According to the first embodiment, the holding surface 121 is a flat surface parallel to horizontal directions. The holding surface 121 has a plurality of grooves 122 defined in its entirety and extending to its outer circumferential edge thereof. The grooves 122 have a width ranging from 0.03 to 0.1 mm and a depth ranging from 0.05 to 0.1 mm each, and are spaced at intervals ranging from 0.1 to 5 mm. The grooves 122 may have a V-shaped or U-shaped cross section. The grooves 122 are formed in the holding surface 121 by a cutting apparatus that is used to cut a semiconductor wafer or the like along streets thereon, with a cutting blade cutting into the holding surface 121 at a predetermined incising feed rate.

The light-emitting bodies 13 are disposed sideways of the surface of the holding member 12 remote from the holding surface 121. According to the first embodiment, the light-emitting bodies 13 are disposed beneath the holding member 12. According to the first embodiment, the light-emitting bodies 13 are disposed on a bottom surface of the fitting cavity 111. The light-emitting bodies 13 are operatively connected to a power supply circuit, not illustrated. When energized by the power supply circuit, the light-emitting bodies 13 emit light toward a lower surface of the holding member 12. The light-emitting bodies 13 are in the form of light-emitting diodes (LEDs), for example.

A plurality of clamps 14 for gripping the annular frame 210 on which the workpiece 200 is supported by the expandable tape 211 are disposed around the chuck table 10. According to the first embodiment, the clamps 14 have base portions disposed in the attachment slot 118 of the chuck table 10 and secured to the cylindrical body 11 of the chuck table 10 by certain fixing means.

The chuck table 10 is rotatable about a central axis parallel to the Z-axis directions by a rotating unit 15. The cylindrical body 11 of the chuck table 10 is rotatably supported on the rotating unit 15, which is of a hollow cylindrical shape, by a bearing 151 for rotation about the central axis parallel to the Z-axis directions. The rotating unit 15 includes a stepping motor, for example. When the stepping motor is energized, the cylindrical body 11 rotates about the central axis parallel to the Z-axis directions. The rotating unit 15 is supported on an upper surface of an X-axis movable plate 16. The rotating unit 15 and the chuck table 10 are movable in the X-axis directions by an X-axis moving unit 50 of the moving assembly 40, which is operatively coupled to the X-axis movable plate 16. The rotating unit 15 and the chuck table 10 are also movable in the Y-axis directions by a Y-axis moving unit 60 of the moving assembly 40, which is operatively coupled to the X-axis movable plate 16, the X-axis moving unit 50, and a Y-axis movable plate 17 on which the X-axis moving unit 50 is mounted.

As illustrated in FIG. 3, the laser beam applying unit 30 is a unit for applying the laser beam 31, which is a pulsed laser beam, to the workpiece 200 held on the chuck table 10. The laser beam applying unit 30 includes a laser oscillator 32, a focused state adjusting unit 33, a mirror 34, and a beam condenser 35.

The laser oscillator 32 oscillates the pulsed laser that has a predetermined wavelength for processing the workpiece 200. Specifically, the wavelength of the laser beam 31 emitted from the laser beam applying unit 30 causes the laser beam 31 to be absorbed by the workpiece 200. The laser oscillator 32 may be a YAG laser oscillator, a YVO4 laser oscillator, or the like, for example.

The focused state adjusting unit 33 changes the size, shape, etc. of the laser beam 31 emitted from the laser oscillator 32. The focused state adjusting unit 33 may have a function to automatically change the size, shape, etc. of the laser beam 31 on the basis of the result of a process, to be described later, carried out by the control unit 100 for determining whether or not the result of a processing process of the laser processing apparatus 1 is acceptable.

The mirror 34 reflects the laser beam 31 that has passed through the focused state adjusting unit 33 toward the workpiece 200 held on the holding surface 121 of the chuck table 10.

According to the first embodiment, the beam condenser 35 is in the form of a condensing lens. The beam condenser 35 condenses the laser beam 31 reflected by the mirror 34 onto the workpiece 200, thereby applying the condensed laser beam 31 to the workpiece 200. As illustrated in FIG. 4, the laser beam 31 thus condensed has a focused spot 36 whose position in the Z-axis directions can be changed by moving the beam condenser 35 in the Z-axis directions. According to the first embodiment, the position in the Z-axis directions of the focused spot 36 of the laser beam 31 is changed when a Z-axis moving unit 70 of the moving assembly 40 moves the laser beam applying unit 30 in the Z-axis directions.

As illustrated in FIG. 1, the moving assembly 40 is as an assembly to move the chuck table 10 and the laser beam applying unit 30 relatively to each other. The moving assembly 40 includes the X-axis moving unit 50, the Y-axis moving unit 60, and the Z-axis moving unit 70.

The X-axis moving unit 50 is a unit for moving the chuck table 10 and the laser beam applying unit 30 relatively to each other in the X-axis directions as the processing feed directions. According to the first embodiment, the X-axis moving unit 50 moves the chuck table 10 in the X-axis directions. According to the first embodiment, the X-axis moving unit 50 is disposed on an apparatus body 2 of the laser processing apparatus 1. The X-axis moving unit 50 supports the X-axis movable plate 16 for movement in the X-axis directions. The X-axis moving unit 50 includes a known ball screw 51, a known stepping motor 52, and a pair of known guide rails 53. The ball screw 51 is rotatable about its own central axis. The stepping motor 52 rotates the ball screw 51 about its own central axis. The guide rails 53 support the X-axis movable plate 16 for movement therealong in the X-axis directions. The guide rails 53 are fixedly mounted on the Y-axis movable plate 17.

The Y-axis moving unit 60 is a unit for moving the chuck table 10 and the laser beam applying unit 30 relatively to each other in the Y-axis directions as the indexing feed directions. According to the first embodiment, the Y-axis moving unit 60 moves the chuck table 10 in the Y-axis directions. According to the first embodiment, the Y-axis moving unit 60 is disposed on the apparatus body 2 of the laser processing apparatus 1. The Y-axis moving unit 60 supports the Y-axis movable plate 17 for movement in the Y-axis directions. The Y-axis moving unit 60 includes a known ball screw 61, a known stepping motor 62, and a pair of known guide rails 63. The ball screw 61 is rotatable about its own central axis. The stepping motor 62 rotates the ball screw 61 about its own central axis. The guide rails 63 support the Y-axis movable plate 17 for movement therealong in the Y-axis directions. The guide rails 63 are fixedly mounted on the apparatus body 2.

The Z-axis moving unit 70 is a unit for moving the chuck table 10 and the laser beam applying unit 30 relatively to each other in the Z-axis directions as focused spot position adjusting directions. According to the first embodiment, the Z-axis moving unit 70 moves the laser beam applying unit 30 in the Z-axis directions. According to the first embodiment, the Z-axis moving unit 70 is disposed on a post 3 erected on the apparatus body 2 of the laser processing apparatus 1. The Z-axis moving unit 70 supports at least the beam condenser 35 of the laser beam applying unit 30 for movement in the Z-axis directions. The Z-axis moving unit 70 includes a known ball screw 71, a known stepping motor 72, and a pair of known guide rails 73. The ball screw 71 is rotatable about its own central axis. The stepping motor 72 rotates the ball screw 71 about its own central axis. The guide rails 73 support the laser beam applying unit 30 for movement therealong in the Z-axis directions. The guide rails 73 are fixedly mounted on the post 3.

The image capturing unit 80 captures an image of the workpiece 200 held on the chuck table 10. The image capturing unit 80 includes, as an image capturing apparatus, a charge-coupled device (CCD) camera or an infrared camera for capturing an image of the workpiece 200 held on the chuck table 10. The image capturing unit 80 is fixed in place adjacent to the beam condenser 35 of the laser beam applying unit 30. The image capturing unit 80 captures an image of the workpiece 200 for use in an alignment process for positioning the workpiece 200 and the laser beam applying unit 30 in alignment with each other, and outputs the captured image to the control unit 100.

The display unit 90 includes a display screen 91 for displaying the state of processing operations, images, etc. The display unit 90 is a display section including a liquid crystal display apparatus or the like. In a case where the display screen 91 includes a touch panel, the display unit 90 may include an input section. The input section is able to accept various actions such as an action taken by the operator of the laser processing apparatus 1 to register information of processing contents. The input section may be an external input apparatus such as a keyboard. The display unit 90 allows to switch between pieces of information and images displayed on the display screen 91 in response to an action entered through the input section. The display unit 90 may include an informing section. The informing section informs the operator of informing information by emitting at least one of sound and light. The informing section may be an external informing apparatus such as a speaker or a light-emitting apparatus. The display unit 90 is operatively connected to the control unit 100.

The control unit 100 controls the components referred to above of the laser processing apparatus 1 to enable the laser processing apparatus 1 to process the workpiece 200. Specifically, the control unit 100 controls the laser beam applying unit 30, the moving assembly 40, the image capturing unit 80, and the display unit 90. The control unit 100 is a computer including an arithmetic processing apparatus as arithmetic processing means, a storage apparatus as storage means, and an input/output interface apparatus as communication means. The arithmetic processing apparatus includes a microprocessor such as a central processing unit (CPU), for example. The storage apparatus has a memory such as a read only memory (ROM) or a random access memory (RAM). The arithmetic processing apparatus performs various arithmetic processing operations according to predetermined programs stored in the storage apparatus. According to the results of arithmetic processing operations performed by the arithmetic processing apparatus, the arithmetic processing apparatus generates and outputs various control signals through the input/output interface apparatus to the components to control the laser processing apparatus 1.

For example, the control unit 100 controls the image capturing unit 80 to capture an image of the workpiece 200. Then, the control unit 100 performs an image processing process on the image captured by the image capturing unit 80. The control unit 100 detects a line to be processed on the workpiece 200 through the image processing process, for example. The control unit 100 controls the moving assembly 40 to move the focused spot 36 of the laser beam 31 along the detected line to be processed and also controls the laser beam applying unit 30 to apply the laser beam 31 to the workpiece 200.

Figure 5:
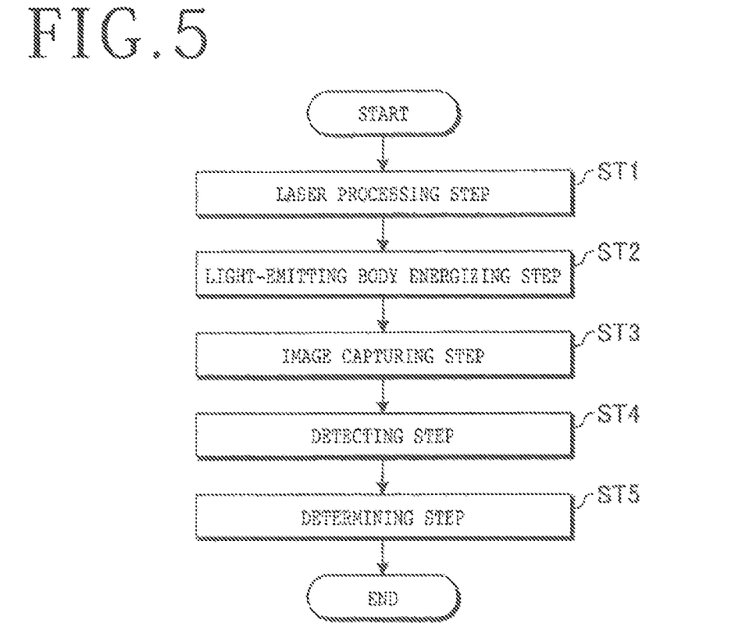
FIG. 5 is a flowchart of a sequence of the method of determining whether or not the result of the processing process of the laser processing apparatus is acceptable according to the first embodiment.

Next, the method of determining whether or not the result of the processing process of the laser processing apparatus 1 is acceptable according to the first embodiment will be described below. FIG. 5 is a flowchart of the sequence of the method of whether or not the result of a processing process of the laser processing apparatus 1 is acceptable according to the first embodiment. The method of determining whether or not the result of the processing process of the laser processing apparatus 1 is acceptable according to the first embodiment includes a laser processing step ST1, a light-emitting body energizing step ST2, an image capturing step ST3, a detecting step ST4, and a determining step ST5.

The laser processing step ST1 is a step of applying the laser beam 31 to predetermined processing regions 201 (see FIG. 6) of the workpiece 200 held on the chuck table 10, thereby performing a piercing process on the workpiece 200. In the laser processing step ST1, predetermined processing conditions are established for the laser processing apparatus 1 illustrated in FIG. 1. Then, as illustrated in FIG. 2, the entire reverse side of the workpiece 200 is placed on the holding surface 121 of the holding member 12 of the chuck table 10. The workpiece 200 is held on the holding surface 121 with the expandable tape 211 interposed therebetween. The annular frame 210 that holds the workpiece 200 through the expandable tape 211 is gripped by the clamps 14.

Next, in the laser processing step ST1, as illustrated in FIGS. 3 and 4, the laser beam applying unit 30 applies the laser beam 31 to the predetermined processing regions 201 (see FIG. 6) of the workpiece 200. On the basis of the predetermined processing conditions, the control unit 100 performs the piercing process along several lines in the predetermined processing regions 201 of the workpiece 200 by applying the laser beam 31 thereto while changing the position of the focused spot 36 of the laser beam 31 on each of the lines. For example, in the laser processing step ST1, the laser beam applying unit 30 applies the laser beam 31 while defocusing the laser beam 31 in the range of −0.3 to +0.3 mm at intervals of 200 μm on each of the lines.

The light-emitting body energizing step ST2 is a step of energizing the light-emitting bodies 13 while the workpiece 200 is being held on the chuck table 10. In the light-emitting body energizing step ST2, the light-emitting bodies 13 emits light sideways of the surface of the holding member 12 remote from the holding surface 121, toward the reverse side of the workpiece 200. When the light emitted from the light-emitting bodies 13 is applied to the reverse side of the workpiece 200, the light is transmitted through the predetermined processing regions 201 of the workpiece 200 on which the piercing process has been performed in the laser processing step ST1.

Figure 6:
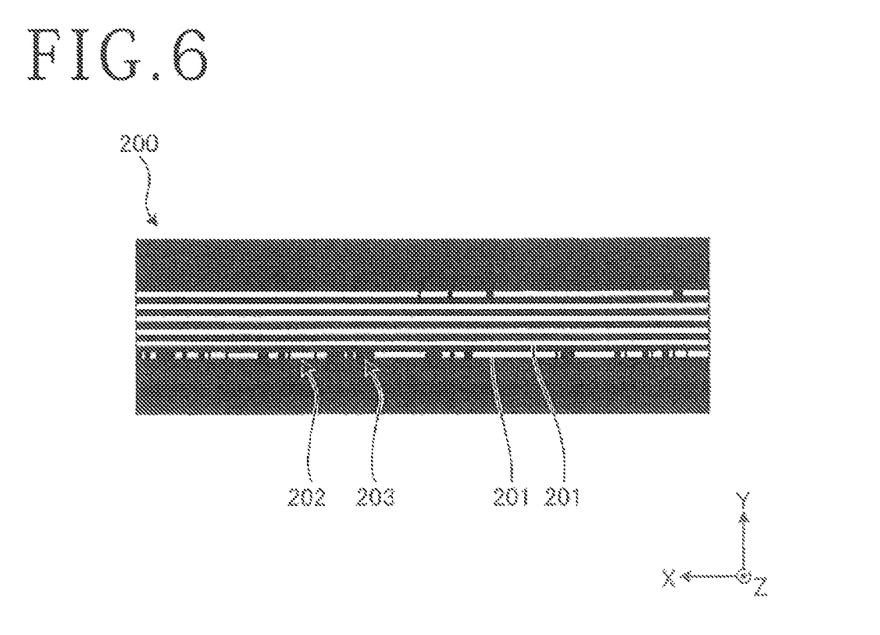
FIG. 6 is a schematic view illustrating an example of an image captured in an image capturing step illustrated in FIG. 5.

FIG. 6 schematically illustrates an example of an image captured in the image capturing step ST3 illustrated in FIG. 5. The image capturing step ST3 is a step of, after the laser processing step ST1 and the light-emitting body energizing step ST2, capturing images of the predetermined processing regions 201 in their entirety while moving the image capturing unit 80 and the workpiece 200 relatively to each other. According to the first embodiment, in the image capturing step ST3, the image capturing unit 80 captures images of all lines one line at a time. In the image capturing step ST3, the image capturing unit 80 may capture a plurality of still images or may capture a moving image. In a case where the image capturing unit 80 captures a moving image in the image capturing step ST3, the image capturing unit 80 captures the moving image while the chuck table 10 is being moved at 300 mm/s, for example. In this case, the observation time is shorter than if the image capturing unit 80 captures still images. The image captured in the image capturing step ST3 may be displayed on the display screen 91 of the display unit 90.

The detecting step ST4 is a step of detecting regions 203 where light is not transmitted through the workpiece 200 in the processing regions 201 included in the image captured in the image capturing step ST3. As illustrated in FIG. 6, the processing regions 201 include regions 202 where the light is transmitted through the workpiece 200 and the regions 203 where light is not transmitted through the workpiece 200. The regions 202 where the light is transmitted through the workpiece 200 are regions where the workpiece 200 has been pierced in the piercing process performed on the workpiece 200 in the laser processing step ST1. The regions 203 where light is not transmitted through the workpiece 200 are regions where the workpiece 200 has not been pierced in the piercing process performed on the workpiece 200 in the laser processing step ST1.

In the detecting step ST4, in order to detect the regions 203 where light is not transmitted, the image captured by the image capturing unit 80 may be converted into a monochromatic image. According to the first embodiment, white areas in the converted monochromatic image are detected as the regions 202 where the light is transmitted through the workpiece 200, whereas black areas in the converted monochromatic image are detected as the regions 203 where light is not transmitted through the workpiece 200. The captured image is converted into a monochromatic image by a binarizing process. In a case where the captured image is a color image, then the captured image is converted into a grayscale image by a grayscale conversion process before the binarizing process. In the binarizing process, if the value of a pixel in the grayscale image exceeds a predetermined threshold value, then the pixel is turned into a white pixel, whereas the value of a pixel in the grayscale image is lower than the predetermined threshold value, then the pixel is turned into a black pixel. The grayscale image is thus converted into a monochromatic image by performing the binarizing process on every pixel of the grayscale image. In a case where the captured image is an 8-bit image having 256 grayscale levels, the predetermined threshold value is 100, for example. The captured image thus processed may be displayed on the display screen 91 of the display unit 90.

The determining step ST5 is a step of determining whether the laser processing apparatus 1 is good or bad, i.e., is acceptable as is or not, on the basis of the detected result from the detecting step ST4. More specifically, in the determining step ST5, if the regions 203 where light is not transmitted through the workpiece 200 are less than a predetermined quantity, then it is determined that the laser processing apparatus 1 does not need to be readjusted. In the determining step ST5, if the regions 203 where light is not transmitted through the workpiece 200 are equal to or more than the predetermined quantity, then it is determined that the laser processing apparatus 1 needs to be readjusted. The predetermined quantity represents a threshold value, that is established on the basis of the position of the focused spot 36 in each of the processing regions 201, for allowing the regions 203 where light is not transmitted through the workpiece 200. If the regions 203 where light is not transmitted through the workpiece 200, i.e., where the workpiece 200 has not been pierced in the piercing process, are equal to or more than the predetermined quantity, then it means that the result of the processing process performed by the laser processing apparatus 1 does not satisfy required criteria. Stated otherwise, various settings of the laser processing apparatus 1, such as the output power of the laser beam 31, the spot diameter of the laser beam 31, the layout of various optical elements of the laser beam applying unit 30, and the relative distances between the optical elements need to be readjusted. The determined result from the determining step ST5 may be displayed on the display screen 91 of the display unit 90.

As described above, the laser processing apparatus 1 that carries out the method of determining whether or not the result of the processing process performed by the laser processing apparatus 1 is acceptable, includes the light-emitting bodies 13 for emitting light toward the reverse side, i.e., the lower surface, of the workpiece 200. After the workpiece 200 has been processed by the laser beam 31, the light-emitting bodies 13 are energized to detect the regions 202 where the light is transmitted through the workpiece 200 and the regions 203 where light is not transmitted through the workpiece 200. The regions 202 where the light is transmitted through the workpiece 200 are regarded as the regions where the workpiece 200 has been pierced in the piercing process, whereas the regions 203 where light is not transmitted through the workpiece 200 are regarded as the regions where the workpiece 200 has not been pierced in the piercing process. By determining whether the regions 203 where light is not transmitted through the workpiece 200 are less than or equal to or more than the predetermined quantity, it is possible to determine, quantitatively on the laser processing apparatus 1, whether or not the result of the piercing process performed by the laser processing apparatus 1 is acceptable. Therefore, measurement errors, indefinite criteria for evaluating the processed workpiece, and other factors that might otherwise be introduced by the operator can be eliminated, thereby preventing the results of processing processes performed by the laser processing apparatus 1 from fluctuating. Since the results of processing operations can automatically be detected and determined on the laser processing apparatus 1, the method according to the invention is also advantageous in that the number of man-hours required by the operator to visually check processed workpieces 200 can be reduced.

[First Modification]

Figure 7:
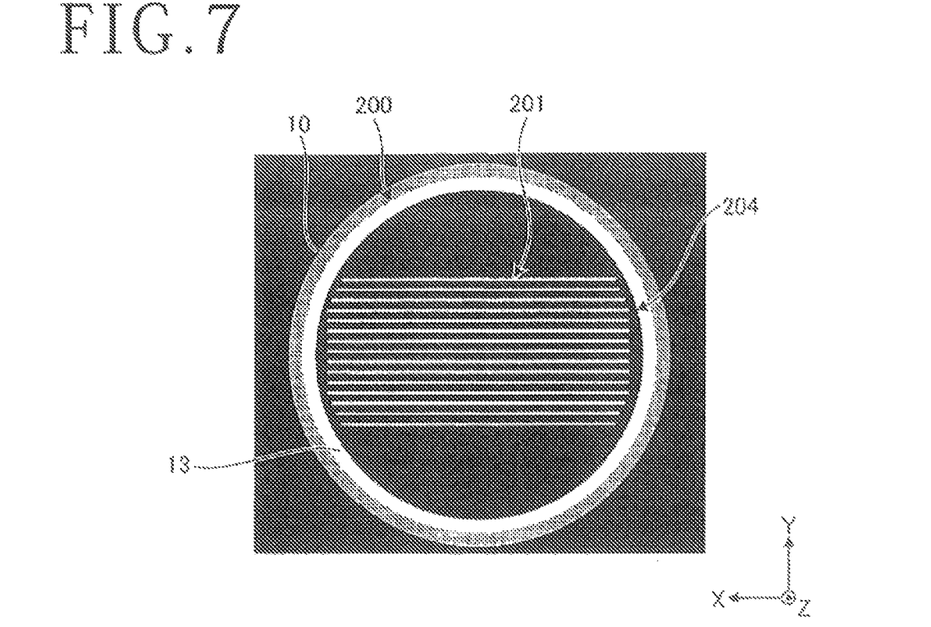
FIG. 7 is a schematic view illustrating an example of an image captured in the image capturing step illustrated in FIG. 5 on a laser processing apparatus according to a first modification.
Figure 8:
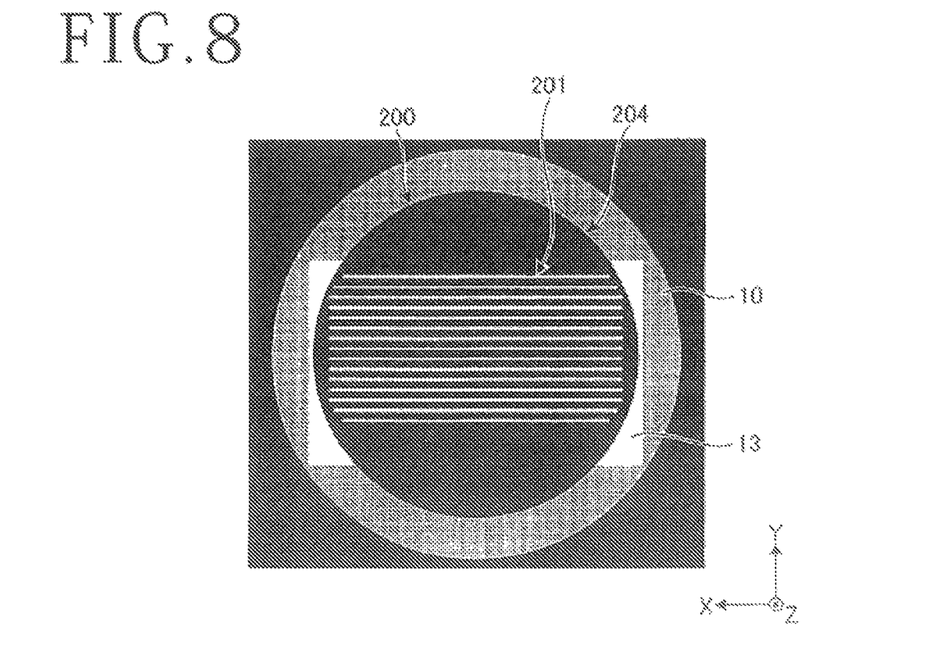
FIG. 8 is a schematic view illustrating another example of an image captured in the image capturing step illustrated in FIG. 5 on the laser processing apparatus according to the first modification.

A method of determining whether or not a result of a processing process of the laser processing apparatus 1 is acceptable according to a first modification will be described below with reference to the drawings. FIG. 7 schematically illustrates an example of an image captured in the image capturing step ST3 illustrated in FIG. 5 on the laser processing apparatus, denoted by 1, according to the first modification. FIG. 8 schematically illustrates another example of an image captured in the image capturing step ST3 illustrated in FIG. 5 on the laser processing apparatus 1 according to the first modification.

In the laser processing apparatus 1 according to the first modification, the image capturing unit 80 includes a line scanning camera. The line scanning camera is a camera including a line sensor in the form of a one-dimensional CCD as an image capturing element. The line scanning camera captures an image of the workpiece 200 while moving relatively to the chuck table 10 in a direction perpendicular to lines whose images are to be captured, for example.

In the method of determining whether or not the result of the processing process performed by the laser processing apparatus 1 is acceptable according to the first modification, the image capturing unit 80 captures an image of the workpiece 200 in its entirety in one scanning stroke. The image capturing unit 80 includes a memory for temporarily storing a plurality of one-dimensional captured image data produced thereby in one scanning stroke, for example. The image capturing unit 80 generates two-dimensional data from the stored one-dimensional captured image data on the memory.

[Second Modification]

Next, a method of determining whether or not a result of a processing process of the laser processing apparatus 1 is acceptable according to a second modification will be described below with reference to the drawings. The method according to the second modification is different from the method according to the first embodiment in that it further includes an outer circumferential edge detecting step and a calculating step.

The outer circumferential edge detecting step is a step of detecting an outer circumferential edge 204 (see FIGS. 7 and 8) of the workpiece 200. In the outer circumferential edge detecting step, the image capturing unit 80 captures an image of the workpiece 200. At this time, the image capturing unit 80 captures an image of the workpiece 200 so as to include the outer circumferential edge 204 therein. In the outer circumferential edge detecting step, the image capturing unit 80 may capture an image of the workpiece 200 in its entirety at once, as with the first modification. In other words, in the outer circumferential edge detecting step, the image capturing unit 80 may capture an image of the workpiece 200 at the same time as the image capturing step ST3 illustrated in FIG. 5. In the outer circumferential edge detecting step, then the outer circumferential edge 204 of the workpiece 200 is detected from the image captured by the image capturing unit 80. The outer circumferential edge 204 of the workpiece 200 may be detected at the same time as or parallel to the detecting step ST4 illustrated in FIG. 5.

The calculating step is a step of calculating the length of one line in its entirety in the processing regions 201 (see FIGS. 7 and 8). In the calculating step, for example, the two-dimensional coordinates of both ends of each line that cross the outer circumferential edge 204 are acquired. Then, in the calculating step, for example, the length of each processed line is calculated on the basis of the two-dimensional coordinates of both ends of each processed line.

According to the second modification, the criterion by which to determine whether the laser processing apparatus 1 is good or bad in the determining step ST5 is represented by a ratio of a length of the regions 203 (see FIG. 6), detected in step ST4, where light is not transmitted through the workpiece 200 to a length of one line in its entirety calculated in the calculating step. In the determining step ST5 according to the second modification, regions where the center of a width cut by the laser beam 31 is displayed as white are detected as the regions 202 (see FIG. 6) where the light is transmitted through the workpiece 200 from the image captured in the image capturing step ST3, and regions where the center of the width cut by the laser beam 31 is displayed as black are detected as the regions 203 (see FIG. 6) where the light is not transmitted through the workpiece 200 from the image captured in the image capturing step ST3. In the determining step ST5, if the regions 203 where the light is not transmitted through the workpiece 200 are less than a predetermined ratio with respect to the length of one line in its entirety calculated in the processing regions 201, for example, then it is determined that the laser processing apparatus 1 does not need to be readjusted. In the determining step ST5, if the regions 203 where the light is not transmitted through the workpiece 200 are equal to or more than the predetermined ratio, then it is determined that the laser processing apparatus 1 needs to be readjusted. The predetermined ratio is 90% or more, preferably be 95% or more, for example.

In the determining step ST5, for example, the image captured of one line in the image capturing step ST3 may be divided into a plurality of images, and the ratio of the length of the regions 203 where light is not transmitted through the workpiece 200 to the length of one line in its entirety in each of the processing regions 201 may be calculated. The captured image may be divided into ten images, for example. In the determining step ST5, if the regions 203 where the light is not transmitted through the workpiece 200 are equal to or more than the predetermined ratio in the processing regions 201 in either one of the divided images, then it may be determined that the laser processing apparatus 1 needs to be readjusted.

Second Embodiment

A method of determining whether or not a result of a processing process performed by a laser processing apparatus is acceptable according to a second embodiment of the present invention will be described below with reference to the drawings. According to the second embodiment, a processing process performed on the workpiece 200 by the laser processing apparatus 1 includes a non-piercing process such as a grooving process for forming grooves in at least the face side of the workpiece 200. The laser processing apparatus 1 that carries out the method of determining whether or not the result of the processing process of the laser processing apparatus 1 is acceptable according to the second embodiment may be of a similar configuration to the laser processing apparatus 1 (see FIG. 1) that carries out the method of determining whether or not the result of the processing process of the laser processing apparatus 1 is acceptable according to the first embodiment. However, in the laser processing apparatus 1 according to the second embodiment, the chuck table 10 is free of the light-emitting bodies 13 and the holding surface 121 including the transparent or semi-transparent member having the holding surface 121 (see FIG. 2). Stated otherwise, the laser processing apparatus 1 according to the second embodiment lacks the configuration for applying light to the reverse side of the workpiece 200 held on the chuck table 10.

Figure 9:
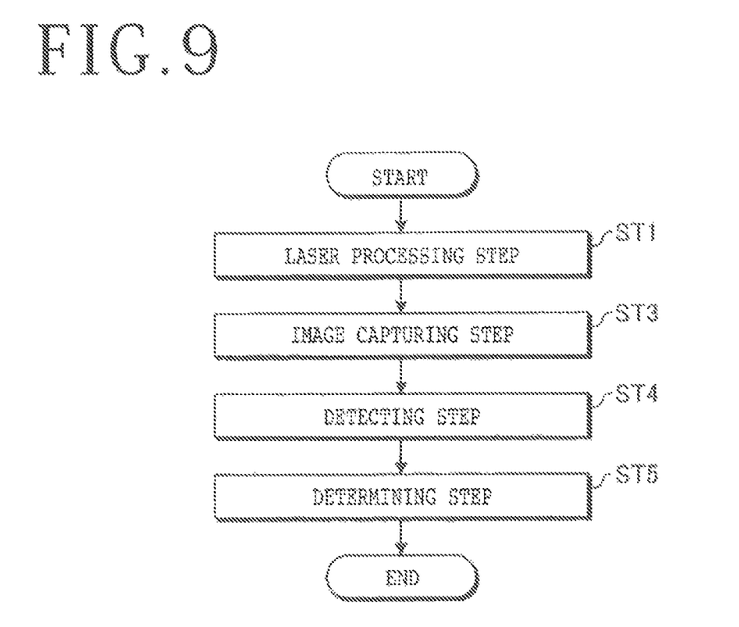
FIG. 9 is a flowchart of a sequence of a method of determining whether or not a result of a processing process of a laser processing apparatus is acceptable according to a second embodiment of the present invention.

FIG. 9 is a flowchart of a sequence of the method of determining whether or not the result of the processing process of the laser processing apparatus 1 is acceptable according to the second embodiment. The method of determining whether or not the result of the processing process of the laser processing apparatus 1 is acceptable according to the second embodiment includes a laser processing step ST1, an image capturing step ST3, a detecting step ST4, and a determining step ST5.

The laser processing step ST1 is a step of applying the laser beam 31 to predetermined processing regions 201 (see FIG. 6) of the workpiece 200 held on the chuck table 10, thereby performing a non-piercing process, such as a grooving process, on the workpiece 200 to leave the workpiece 200 unpierced therethrough. Since the laser processing step ST1 according to the second embodiment is basically similar to the laser processing step ST1 according to the first embodiment except that the workpiece 200 is not pierced therethrough by the laser beam, details of the laser processing step ST1 according to the second embodiment will be omitted below.

Figure 10:
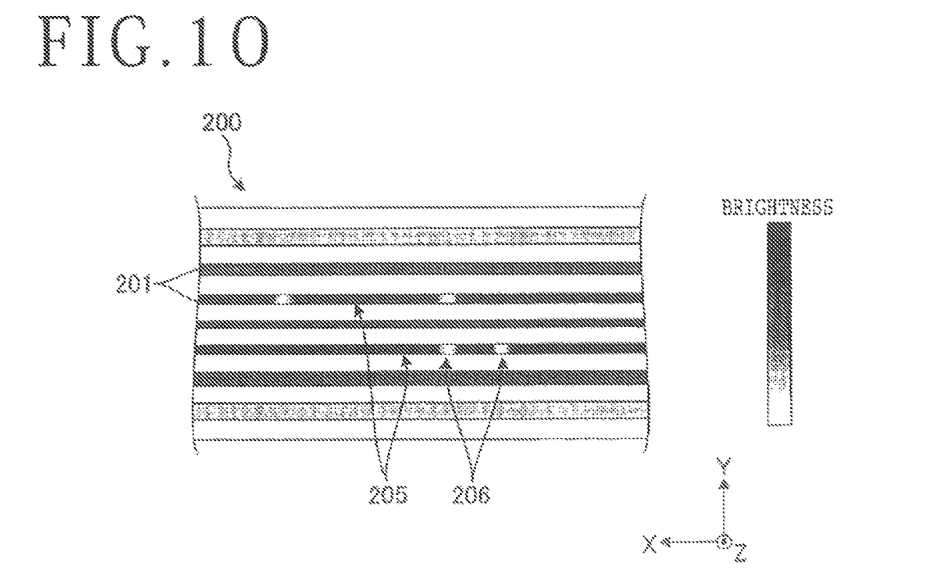
FIG. 10 is a schematic view illustrating an example of an image captured in an image capturing step illustrated in FIG. 9.

FIG. 10 schematically illustrates an example of an image captured in the image capturing step ST3 illustrated in FIG. 9. The image capturing step ST3 according to the second embodiment is a step of capturing images of all predetermined processing regions 201 while moving the image capturing unit 80 and the workpiece 200 relatively to each other, after the laser processing step ST1. Inasmuch as the image capturing step ST3 according to the second embodiment is of a similar sequence to the image capturing step ST3 according to the first embodiment, details of the image capturing step ST3 according to the second embodiment will be omitted below. In the image capturing step ST3 according to the second embodiment, the image capturing unit 80 may capture an image of the workpiece 200 in its entirety in one scanning stroke as with the image capturing step ST3 according to the first modification.

The detecting step ST4 according to the second embodiment detects regions 206 whose brightness is equal to or more than a predetermined value among the processing regions 201 in the image captured in the image capturing step ST3. As illustrated in FIG. 10, each of the processing regions 201 includes regions 205 whose brightness is less than the predetermined value and regions 206 whose brightness is equal to or more than the predetermined value. The regions 205 whose brightness is less than the predetermined value are regions where the depth of grooves formed in the non-piercing process in the laser processing step ST1 is equal to or more than a predetermined value. The regions 206 whose brightness is equal to or more than the predetermined value are regions where the depth of grooves formed in the non-piercing process in the laser processing step ST1 is less than the predetermined value. In the detecting step ST4, the captured image may be converted into a monochromatic image, as with the first embodiment. In the detecting step ST4, specifically, the regions 205 whose brightness is less than the predetermined value may be replaced with black regions and the regions 206 whose brightness is equal to or more than the predetermined value may be replaced with white regions, using the predetermined value of brightness as a threshold value. The predetermined value of brightness serves as a threshold value that is preset depending on the brightness and direction of illumination, the material of the workpiece 200, the type of the processing process, etc.

The determining step ST5 according to the second embodiment is a step of determining whether the laser processing apparatus 1 is good or bad, i.e., is acceptable as is or not, on the basis of the detected result from the detecting step ST4. More specifically, in the determining step ST5, if the regions 206 whose brightness is equal to or more than the predetermined value is equal to or more than a predetermined quantity, then it is determined that the laser processing apparatus 1 needs to be readjusted. In the determining step ST5, if the regions 206 whose brightness is equal to or more than the predetermined value is less than the predetermined quantity, then it is determined that the laser processing apparatus 1 does not need to be readjusted. If the regions 206 whose brightness is equal to or more than the predetermined value, indicating that the depth of grooves formed in the non-piercing process is equal to or less than the predetermined value, is equal to or more than the predetermined quantity, it means that the result of the processing process performed by the laser processing apparatus 1 does not satisfy required criteria. Stated otherwise, various settings of the laser processing apparatus 1, such as the output power of the laser beam 31, the spot diameter of the laser beam 31, the layout of various optical elements of the laser beam applying unit 30, and the relative distances between the optical elements need to be readjusted.

The method of determining whether or not the result of the processing process of the laser processing apparatus 1 is acceptable according to the second embodiment may further include the outer circumferential edge detecting step and the calculating step according to the second modification. In this case, the criterion by which to determine whether the laser processing apparatus 1 is good or bad in the determining step ST5 is represented by a ratio of a length of the regions 206 whose brightness detected in the detecting step ST4 is equal to or more than the predetermined value to a length of one line in its entirety calculated in the calculating step. In the determining step ST5, if the regions 206 whose brightness is equal to or more than the predetermined value are less than a predetermined ratio with respect to the length of one line in its entirety calculated in the processing regions 201, for example, then it is determined that the laser processing apparatus 1 does not need to be readjusted. In the determining step ST5, if the regions 206 whose brightness is equal to or more than the predetermined value are equal to or more than the predetermined ratio, then it is determined that the laser processing apparatus 1 needs to be readjusted. The predetermined ratio is 90% or more, preferably be 95% or more, for example.

As described above, the method of determining whether or not the result of the processing process performed by the laser processing apparatus 1 is acceptable according to the second embodiment detects the regions 205 whose brightness is less than the predetermined value and regions 206 whose brightness is equal to or more than the predetermined value after the laser processing apparatus 1 has processed the workpiece 200 with the laser beam 31. The regions 205 whose brightness is less than the predetermined value are regarded as the regions where the depth of formed grooves is equal to or more than a predetermined value, and the regions 206 whose brightness is equal to or more than the predetermined value are regarded as the regions where the depth of formed grooves is equal to or less than the predetermined value, for example. By determining whether the regions 206 whose brightness is equal to or more than the predetermined value are less than or equal to or more than the predetermined quantity, it is possible to determine, quantitatively on the laser processing apparatus 1, whether or not the result of the piercing process performed by the laser processing apparatus 1 is acceptable. Therefore, measurement errors, indefinite criteria for evaluating the processed workpiece, and other factors that might otherwise be introduced by the operator can be eliminated, thereby preventing the results of processing processes performed by the laser processing apparatus 1 from fluctuating. Since the results of processing processes can automatically be detected and determined on the laser processing apparatus 1, the method according to the invention is also advantageous in that the number of man-hours required by the operator to visually check processed workpieces 200 can be reduced.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of determining whether or not a result of a processing process of a laser processing apparatus is acceptable, the laser processing apparatus including a chuck table including a transparent or semitransparent holding member having a holding surface for holding an entire surface of a workpiece and light-emitting bodies disposed sideways of a surface of the holding member remote from the holding surface, a laser beam applying unit for applying a laser beam having a wavelength that is absorbable to the workpiece to the workpiece held on the chuck table, a moving unit for moving the chuck table and the laser beam applying unit relatively to each other, an image capturing unit for capturing an image of the workpiece held on the chuck table, and a controller connected to and configured to control the laser beam applying unit, the moving unit, and the image capturing unit, the method comprising:

a laser processing step comprising applying a laser beam to predetermined processing regions of the workpiece held on the chuck table by the laser beam applying unit, thereby performing a piercing process on the workpiece;

a light-emitting body energizing step comprising energizing the light-emitting bodies while the workpiece is being held on the chuck table;

after the laser processing step and the light-emitting body energizing step, an image capturing step comprising capturing images of all the processing regions by the image capturing unit while moving the image capturing unit and the workpiece relatively to each other;

a detecting step comprising detecting regions where light is not transmitted through the workpiece among the processing regions by the controller analyzing the image captured in the image capturing step; and after the detecting step, a determining step comprising determining that the laser processing apparatus does not need to be readjusted if the regions where light is not transmitted through the workpiece is less than a predetermined quantity and that the laser processing apparatus needs to be readjusted if the regions where light is not transmitted through the workpiece is equal to or more than the predetermined quantity by the controller.

2. The method of determining whether or not the result of the processing process of the laser processing apparatus is acceptable according to claim 1, further comprising:

an outer circumferential edge detecting step comprising detecting an outer circumferential edge of the workpiece by capturing an image of the workpiece with the image capturing unit; and a calculating step of calculating a length of one entire line in the processing regions on a basis of a result of the outer circumferential edge detecting step by the controller, wherein a criterion by which to determine whether or not the laser processing apparatus needs to be readjusted in the determining step includes a ratio of a length of the regions where light is not transmitted through the workpiece as detected in the detecting step to the length of one line in its entirety calculated in the calculating step.

3. The method of determining whether or not the result of the processing process of the laser processing apparatus is acceptable according to claim 1, wherein the image capturing unit includes a line scanning camera, and the image capturing step includes capturing an image of the entire workpiece in one scanning stroke.

* * * * *